US011770186B2

(12) United States Patent
Rao et al.

(10) Patent No.: US 11,770,186 B2
(45) Date of Patent: Sep. 26, 2023

(54) METHOD AND APPARATUS FOR A RESTORATION NETWORK WITH DYNAMIC ACTIVATION OF PRE-DEPLOYED NETWORK RESOURCES

(71) Applicant: Infinera Corporation, San Jose, CA (US)

(72) Inventors: Rajan Rao, San Jose, CA (US); Wayne Wauford, San Jose, CA (US); Vinesh Raghavan, San Jose, CA (US); Prasanjeet Khuntia, San Jose, CA (US)

(73) Assignee: Infinera Corporation, San Jose, CA (US)

( * ) Notice: Subject to any disclaimer, the term of this patent is extended or adjusted under 35 U.S.C. 154(b) by 0 days.

(21) Appl. No.: 17/700,474

(22) Filed: Mar. 21, 2022

(65) Prior Publication Data

US 2022/0216915 A1 Jul. 7, 2022

Related U.S. Application Data

(62) Division of application No. 16/731,660, filed on Dec. 31, 2019, now Pat. No. 11,283,518.
(Continued)

(51) Int. Cl.
*H04B 10/03* (2013.01)
*H04B 10/032* (2013.01)
(Continued)

(52) U.S. Cl.
CPC .......... *H04B 10/032* (2013.01); *G06F 16/22* (2019.01); *G06Q 30/018* (2013.01);
(Continued)

(58) Field of Classification Search
CPC .. H04B 10/032; H04B 10/0795; H04B 10/25; H04B 10/03; G06F 16/22; G06Q 30/018;
(Continued)

(56) References Cited

U.S. PATENT DOCUMENTS

2002/0005968 A1* 1/2002 Suzuki ............... H04J 14/0295
398/79
2004/0205239 A1* 10/2004 Doshi .................... H04L 45/12
709/241
(Continued)

*Primary Examiner* — Dibson J Sanchez
(74) *Attorney, Agent, or Firm* — David L. Soltz (57) ABSTRACT

An optical network having a first terminal node, a second terminal node, and a network service system is described. The first terminal node has a plurality of ports and a signal restoration component to create a restored path. The second terminal node has a plurality of ports and a failure monitor to issue a path failure notice. A working path, a protection path, and the restored path are each fiber optic lines optically coupling the first terminal node to the second terminal node to enable a service, each path requiring a quantity of exclusive licenses. The network service system receives a path failure notice indicating a working path failure, calculates the quantity of licenses required by the restored path, releases the quantity of licenses required by the working path and applies at least a portion of the quantity of licenses to the quantity of licenses required by the restored path.

6 Claims, 5 Drawing Sheets

Related U.S. Application Data (60) Provisional application No. 62/932,826, filed on Nov. 8, 2019.

(51) Int. Cl.
*H04J 14/02* (2006.01)
*G06F 16/22* (2019.01)
*H04B 10/079* (2013.01)
*G06Q 30/018* (2023.01)
*H04B 10/25* (2013.01)

(52) U.S. Cl.
CPC ......... *H04B 10/0795* (2013.01); *H04B 10/25* (2013.01); *H04J 14/02* (2013.01); *H04B 10/03* (2013.01); *H04J 14/0287* (2013.01)

(58) Field of Classification Search
CPC .... H04J 14/02; H04J 14/0287; H04J 14/0268; H04J 14/0291
USPC .......................................... 398/1–8, 43–103
See application file for complete search history.

(56) References Cited

U.S. PATENT DOCUMENTS

| | | | | |
|---|---|---|---|---|
| 2005/0226210 | A1* | 10/2005 | Martin | H04Q 11/0062 370/351 |
| 2006/0153496 | A1* | 7/2006 | Tanobe | H04Q 11/0062 385/24 |
| 2008/0291924 | A1* | 11/2008 | Ishii | H04L 45/00 370/400 |
| 2009/0034975 | A1* | 2/2009 | Sadananda | H04J 14/0295 398/79 |
| 2009/0263124 | A1* | 10/2009 | Akyamac | H04L 41/0663 398/17 |
| 2009/0310960 | A1* | 12/2009 | Xu | H04J 14/0295 398/4 |
| 2012/0134263 | A1* | 5/2012 | Xiang | H04L 45/42 370/228 |
| 2017/0317953 | A1* | 11/2017 | Sareen | H04L 49/25 |
| 2020/0382209 | A1* | 12/2020 | Hou | H04J 3/14 |

\* cited by examiner

METHOD AND APPARATUS FOR A RESTORATION NETWORK WITH DYNAMIC ACTIVATION OF PRE-DEPLOYED NETWORK RESOURCES

INCORPORATION BY REFERENCE

The present patent application is a divisional of U.S. Ser. No. 16/731,660, filed Dec. 31, 2019, which claims priority to the provisional patent application identified by U.S. Ser. No. 62/932,826 filed on Nov. 8, 2019, the entire content of each of which is hereby incorporated by reference.

BACKGROUND

Optical networking is a communication means that utilizes signals encoded in light to transmit information in various types of telecommunications networks. Optical networking may be used in relatively short-range networking applications such as in a local area network (LAN) or in long-range networking applications spanning countries, continents, and oceans. Generally, optical networks utilize optical amplifiers, a light source such as lasers or LEDs, and wave division multiplexing to enable high-bandwidth, trans-continental communication.

Optical networks include both free-space optical networks and fiber optic networks. Free-space networks transmit signals across open space without the use of a specific medium for the light. An example of a free-space optical network includes Starlink by SpaceX. A fiber-optic network, however, utilizes fiber optic cables made of glass fiber to carry the light through a network.

Network providers build and maintain optical networks and provide network capacity, such as ports and bandwidth, to users as part of a Service Level Agreement (SLA), which may include network uptime commitments. In order to meet uptime commitments and maintain resource availability, network providers have traditionally deployed additional network capacity from the outset such that an optical network built for resiliency against a single failure requires at least twice the deployed resources as the provided network capacity. Further, an optical network built for resiliency against multiple failures (e.g. 2 or more failures) requires at least three times the deployed resources as the provided network capacity.

Deployment of additional capacity to meet resiliency requirements increases costs and creates idle network capacity when resources reserved for recovery are not in use. Idle network capacity can create additional costs because network providers cannot generate revenue from idle capacity but must bear the cost of maintaining and purchasing equipment that provides such idle capacity.

Thus, a need exists for techniques that maintain network uptime commitments and decrease the costs associated with idle optical network capacity.

SUMMARY

The problem of decreasing the costs associated with idle optical network capacity while maintaining network uptime commitments is solved with the methods and systems described herein, by releasing a first quantity of licenses from use by applying at least a portion of the first quantity of licenses to a third quantity of licenses subsequent to switching a transmission signal from a working path to a protection path, and creating a restored path. Various embodiments for decreasing costs and maintaining network commitments are described below.

In one embodiment, an optical network is described. The optical network includes a first terminal node, a second terminal node, and a network service system. The first terminal node has a first port, a second port, a third port, and a signal restoration component. The signal restoration component is configured to, upon receipt of a path failure notice, switch a transmission signal from a working path to a protection path and to create a restored path. The second terminal node has a fourth port, a fifth port, a sixth port, and a failure monitor. The failure monitor is configured to issue the path failure notice when a path failure has occurred. The working path connects the first terminal node to the second terminal node to enable communication of the transmission signal between the first port of the first terminal node and the fourth port of the second terminal node. The working path may be a first fiber optic line optically coupling the first terminal node to the second terminal node. The working path requires a first quantity of licenses in use to operate. The protection path connects the second port of the first terminal node to the fifth port of the second terminal node to enable communication of the transmission signal between the first terminal node and the second terminal node. The protection path may be a second fiber optic line optically coupling the first terminal node to the second terminal node and is different from the first fiber optic line. The protection path is diverse from the working path and requires a second quantity of licenses in use to operate where the first quantity of licenses and the second quantity of licenses are mutually exclusive. The network service system has a non-transitory computer readable medium storing computer executable code that when executed by a processor causes the processor to receive the path failure notice, calculate a third quantity of licenses required by the restored path, release the first quantity of licenses from use and apply at least a portion of the first quantity of licenses to the third quantity of licenses. The restored path connects the third port of the first terminal node to the sixth port of the second terminal node to enable communication of the transmission signal between the first terminal node and the second terminal node. The restored path may be a third fiber optic line optically coupling the first terminal node to the second terminal node and is different from the first fiber optic line and the second fiber optic line. The restored path is different from the working path and the protection path. The third quantity of licenses and the second quantity of licenses are mutually exclusive.

In another embodiment, a capacity control engine is described. The capacity control engine includes a processor and a non-transitory computer readable medium storing computer executable code. When executed, the computer executable code causes the processor to monitor a first component and a second component for a failure. The first component is required to provide a service and requires a first quantity of licenses to provide the service. The second component is required to provide the service in case of a failure of the first component and requires a second quantity of licenses to provide the service. The second quantity of licenses is mutually exclusive with the first quantity of licenses. The computer executable code further causes the processor to receive a failure notice indicating a failure of the first component and identifying a third component. The third component is required to provide the service in case of a failure of the second component. The computer executable code further causes the processor to, upon receiving the failure notice, release the first quantity of licenses from use with the first component, calculate a third quantity of licenses required by the third component to provide the service where the third quantity of licenses is mutually exclusive with the second quantity of licenses, and apply at least a portion of the first quantity of licenses released to the third quantity of licenses required to provide the service.

In yet another embodiment, a capacity control engine is disclosed. The capacity control engine includes a processor and a non-transitory computer readable medium storing computer executable code. When executed, the computer executable code causes the processor to: track license usage data and license purchase data for each user, store license usage data and license purchase data; and, coordinate use of licenses based on a network state such that upon receiving a notification of creation of a restored path due to the network state showing a failed path and a protection path, each license used by the failed path is released to an unused license pool and each license required by the restored path is selected from the unused license pool.

BRIEF DESCRIPTION OF THE SEVERAL VIEWS OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The disclosure is capable of other embodiments or of being practiced or carried out in various ways. Also, it is to be understood that the phraseology and terminology employed herein is for purposes of description and should not be regarded as limiting.

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements but may also include other elements not expressly listed or inherent to such process, method, article, or apparatus.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

As used herein, qualifiers like "substantially," "about," "approximately," and combinations and variations thereof, are intended to include not only the exact amount or value that they qualify, but also some slight deviations therefrom, which may be due to computing tolerances, computing error, manufacturing tolerances, measurement error, wear and tear, stresses exerted on various parts, and combinations thereof, for example.

As used herein, any reference to "one embodiment," "an embodiment," "some embodiments," "one example," "for example," or "an example" means that a particular element, feature, structure or characteristic described in connection with the embodiment is included in at least one embodiment and may be used in conjunction with other embodiments. The appearance of the phrase "in some embodiments" or "one example" in various places in the specification is not necessarily all referring to the same embodiment, for example.

The use of ordinal number terminology (i.e., "first", "second", "third", "fourth", etc.) is solely for the purpose of differentiating between two or more items and, unless explicitly stated otherwise, is not meant to imply any sequence or order of importance to one item over another.

The use of the term "at least one" or "one or more" will be understood to include one as well as any quantity more than one. In addition, the use of the phrase "at least one of X, Y, and Z" will be understood to include X alone, Y alone, and Z alone, as well as any combination of X, Y, and Z.

Wavelength-division multiplexing (WDM) is the technique of transmitting one or more channels of information through a single optical fiber by sending multiple light beams of different wavelengths through the fiber as a transmission signal, each light beam modulated with a separate information channel. Wavelength-division multiplexing requires a wavelength division multiplexer in transmitter equipment and a demultiplexer in receiver equipment or both a multiplexer and a demultiplexer in transceiver equipment, such as a ROADM.

A reconfigurable add-drop multiplexer (ROADM) node is an all-optical subsystem that enables remote configuration of wavelengths at any ROADM node. A ROADM is software-provisionable so that a network operator can choose whether a wavelength is added, dropped, or passed through the ROADM node. The technologies used within the ROADM node include wavelength blocking, planar lightwave circuit (PLC), and wavelength selective switching (WSS)—though the WSS has become the dominant technology. A ROADM system is a metro/regional WDM or long-haul DWDM system that includes a ROADM node. ROADMs are often talked about in terms of degrees of switching, ranging from a minimum of two degrees to as many as eight degrees, and occasionally more than eight degrees. A "degree" is another term for a switching direction and is generally associated with a transmission fiber pair. A two-degree ROADM node switches in two directions, typically called East and West. A four-degree ROADM node switches in four directions, typically called North, South, East, and West. In a WSS-based ROADM network, each degree requires an additional WSS switching element. So, as the directions switched at a ROADM node increase, the ROADM node's cost increases. As used herein, the terms "node" or "network node" may refer to one or more ROADM.

As described herein, channels, or network channels, may refer to an entire network channel or a portion of a network channel. A channel is a predetermined wavelength range of a transmission signal and may correspond to one or more light beam.

As used herein, a span is the spread or extent of a fiber optic cable between the fiber optic cables' terminals. Generally, a span is an unbroken or uninterrupted segment of fiber optic cable between nodes.

As used herein, a fiber optic line means a series of one or more spans of a fiber optic cable for conveying a transmission signal from an origin to a destination. Thus, a fiber optic line could include one, two, three or more fiber optic cables that may be connected in series by one or more intermediate node.

As used herein, a service is the use of one or more channel to transmit data from an origin to a destination. A service may be a path within an optical network available for client use. 100GE service refers to carrying 100GE client signal over one or more wavelengths in a ROADM or optical network. Services may include SONET/SDH services, gigabit Ethernet (GbE) services, OTN services, and/or fiber channel (FC) services.

Figure 1A:
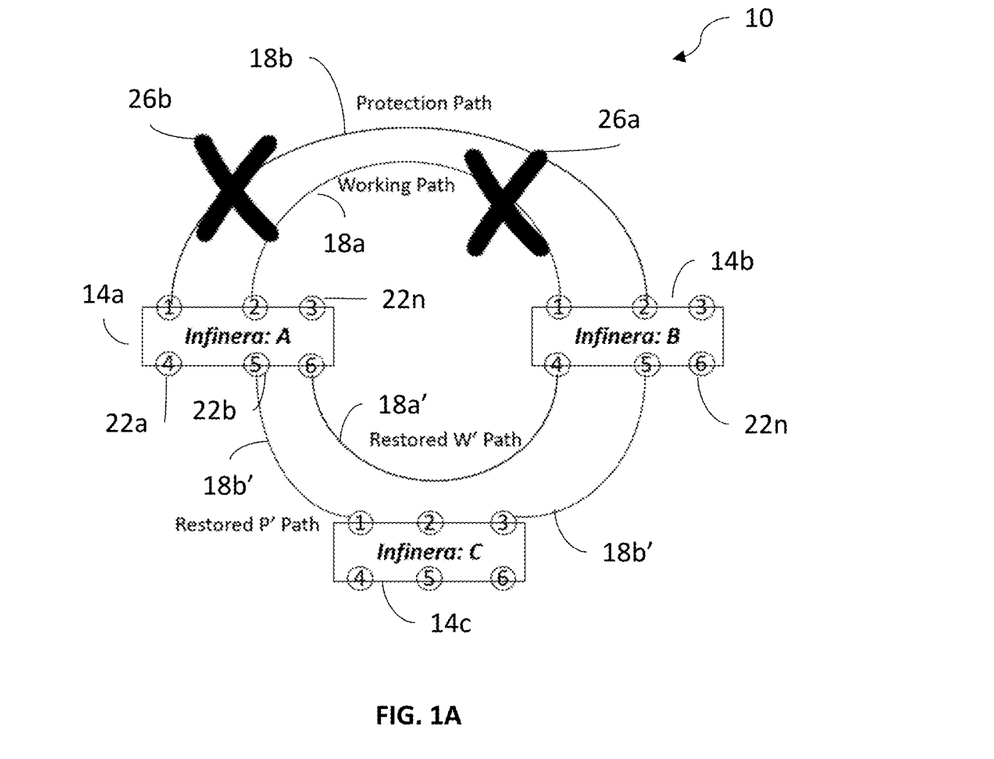
FIG. 1A is an exemplary diagram of an optical network segment.

Referring now to the drawings, and in particular to FIG. 1A, shown therein is an exemplary embodiment of an optical network segment 10 having a plurality of nodes 14 including a first node 14a and a second node 14b connected by two or more paths 18 such as a working path 18a and a protection path 18b. Each node 14 within the optical network segment 10 has a plurality of ports 22a-n where each port 22 has at least one fiber optic terminal and can transmit and/or receive a predetermined bandwidth of data. The optical network segment 10 is shown for simplicity as having the working path 18a and the protection path 18b between two nodes, however, each path 18 may traverse one or more node between the first node 14a and the second node 14b.

Further shown in FIG. 1A is a first path failure 26a on the working path 18a and a second path failure 26b on the protection path 18b. The first path failure 26a may be any failure within the optical network segment 10 that prevents a transmission signal from traveling along the working path 18a between the first node 14a and the second node 14b. The second path failure 26b may also be any failure within the optical network segment 10 that prevents a transmission signal from traveling along the protection path 18b between the first node 14a and the second node 14b. In some instances, each path failure 26 may be a cut fiber optic cable, a failure of an amplifier on the working path 18a, a failure at the first node 14a at a port 22 connected to the path 18, or a failure at the second node 14b at a port 22 connected to the path 18, or some combination thereof. As discussed in more detail below, the optical network segment 10 includes a restored working path 18a', a restored protection path 18b', and a third node 14c. In one embodiment, each port 22a-n is a hardware port on the node 14. In another embodiment, each port 22a-n represents a predetermined and uniform unit of bandwidth of the node 14. Any path 18 having a path failure 26, e.g. the working path 18a having the first path failure 26a, may be referred to as a failed path. For example only and not by way of limitation, each port 22a-n may represent 100 gigabits per second (gbps) of bandwidth available at a particular node 14. For each port 22, the unit of bandwidth of the node 14 may be either monodirectional or bidirectional.

In one embodiment, the working path 18a is a path the transmission signal travels from a first terminal node, depicted in FIG. 1A as the first node 14a, to a second terminal node, depicted in FIG. 1A as the second node 14b. A terminal node may transmit, receive, or both transmit and receive the transmission signal on the fiber optic path. In one embodiment, each terminal node may include one or more field replaceable unit (FRU) to send and/or receive the transmission signal on the ROADM network. The ROADM network may be an optical network. The working path 18a may include one or more node 14 between the first terminal node and the second terminal node. The working path 18a may further include one or more in-line amplifier (not shown) between each node 14.

In one embodiment, the protection path 18b is a path the transmission signal may travel from the first terminal node to the second terminal node and is diverse from the working path 18a such that either the nodes of working path 18a and the nodes of protection path 18b are mutually exclusive or the fiber optic lines of working path 18a and fiber optic lines of protection path 18b are mutually exclusive, or both. In one embodiment, each terminal node may include one or more field replaceable unit (FRU) to send and/or receive the transmission signal on the ROADM network. The working path 18a may include one or more node 14 between the first terminal node and the second terminal node. The working path 18a may further include one or more in-line amplifier (not shown) between each node 14. The protection path 18b may be described as an alternative path, or backup path, for the transmission signal to travel if the transmission signal is unable to traverse the working path 18a. By maintaining the protection path 18b, a network services provider can meet redundancy requirements of a service level agreement and ensure any path failure 26 is accounted for as quickly as possible in order to maintain service uptime.

In one embodiment, the working path 18a and the protection path 18b are routed diversely in the network such that any path failure 26 within the working path 18a is not also a path failure 26 within the protection path 18b. Similarly, the protection path 18b and the restored working path 18a' are routed diversely in the network such that any path failure 26 within the protection path 18b is not also a path failure 26 within the restored working path 18a'. Diversity may include either node diversity or fiber diversity or both and may be referred to as a Shared Risk Link Group or a Shared Risk Resource Group depending on whether links or resources are shared within two or more particular paths. Node diversity may refer to a lack of commonality between the nodes of a first path, such as the working path 18a, and a second path, such as the protection path 18b. Similarly, fiber diversity may refer to a lack of commonality between the fiber optic lines connecting the nodes of the first path and the fiber optic lines connecting the nodes of the second path. A Node Diverse path protects against node failures, while a Fiber Diverse path protects against a path failure due to a failure of the fiber line, however, the working path and the protection path in a fiber diverse path may utilize the same node.

In one embodiment the working path 18*a* and the protection path 18*b* are created by a management system 116 (shown in FIG. 2, and discussed in more detail below) before a service requiring the path is enabled. The management system 116 may create both the working path 18*a* and the protection path 18*b* independently of additional user interaction. In one embodiment, the management system 116 may optimize each path 18 in order to minimize the number of licenses needed for the path or may optimize each path 18 in order to minimize length of the path. In another embodiment, the management system 116 may determine how to optimize each path 18 based on user input to the license store component 104.

Figure 1B:
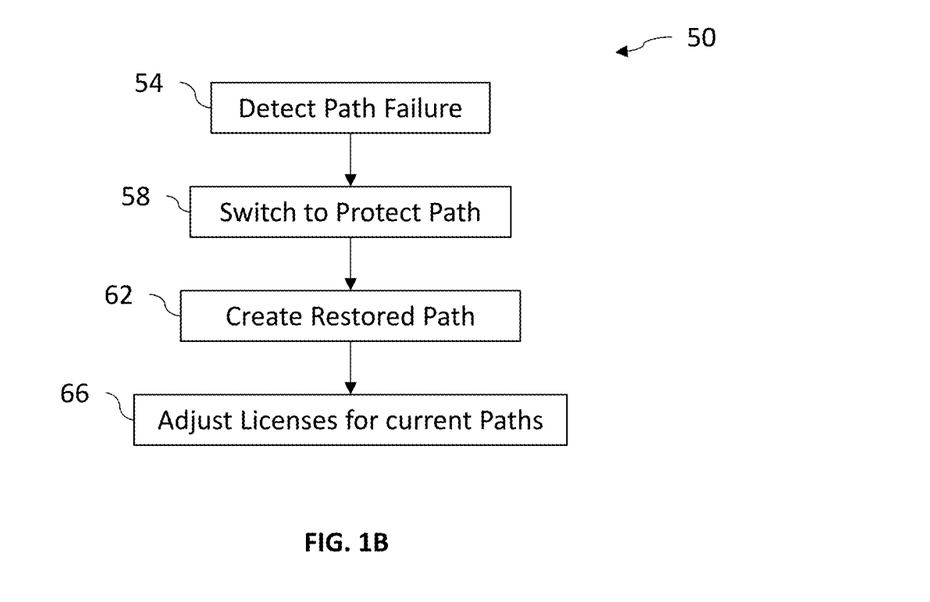
FIG. 1B is an exemplary process flow diagram of an optical network restoration process.

Referring now to FIG. 1B, shown therein is an exemplary process flow diagram of an optical network restoration process 50 being executed by the management system 116. The optical network restoration process 50 generally comprises the steps of detecting one or more path failure 26 (step 54); switching to the protection path 18*b* (step 58); creating a restored path 18' (step 62); and, adjusting client licenses based on the changes in the paths 18 and restored paths 18' (step 66).

Figure 6:
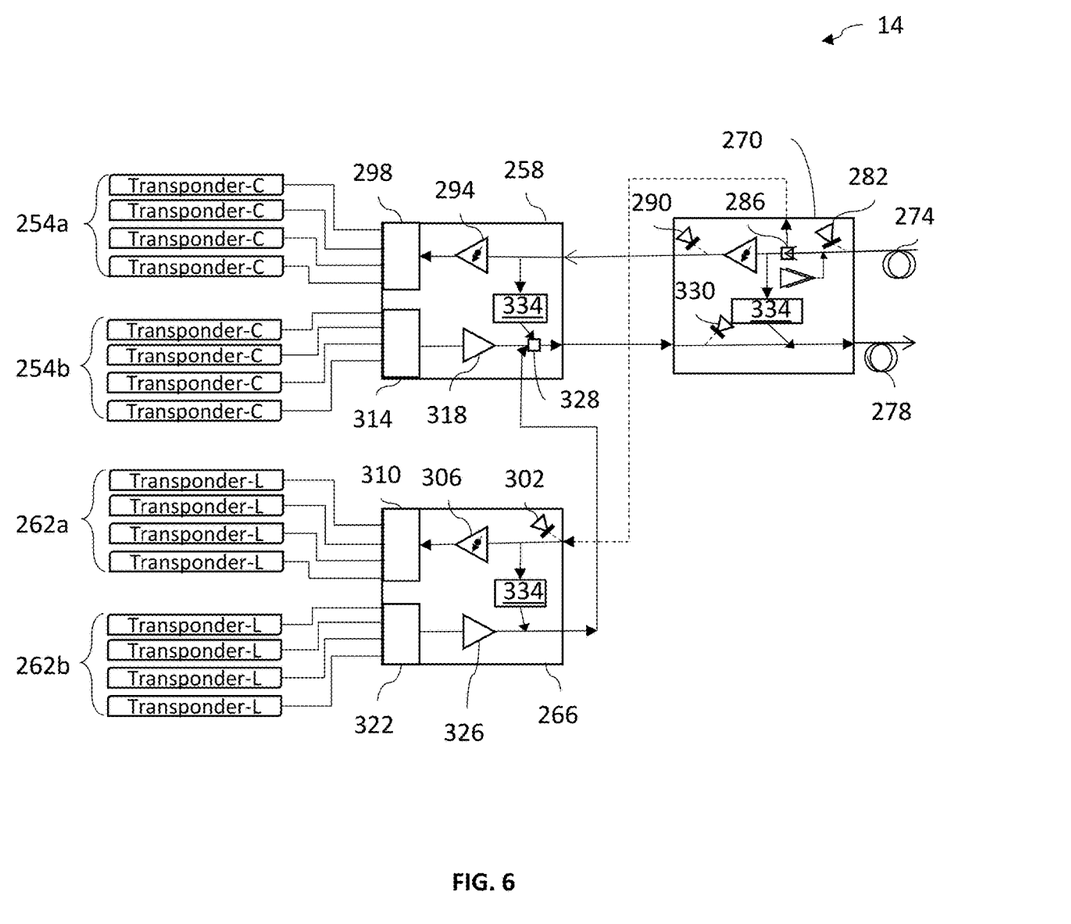
FIG. 6 is a diagram of an exemplary embodiment of a node terminal in an optical network.

In one embodiment, detecting one or more path failure 26 (step 54) may be performed by the management system 116 (discussed in more detail below). The path failure 26 may be detected by the first node 14*a*, the second node 14*b*, or by one or more signal monitors situated along the path 18, such as after and/or before signal amplifiers such as shown in FIG. 6. The one or more signal monitors may be situated such that an origin of the path failure 26 may be identified. In one embodiment, the first node 14*a*, the second node 14*b*, and/or the one or more signal monitors may notify the management system 116 of one or more path failure 26, such as the path failure 26*a* and/or path failure 26*b*, such as with a failure notice. A failure notice may contain data that indicates the path 18 having the path failure 26 and/or may contain data indicating an element within the optical network causing the path failure 26.

In one embodiment, switching to the protection path 18*b* (step 58) is performed by the nodes. After detecting one or more path failure 26 (step 54), the second node 14*b* may issue commands to the first node 14*a* causing each node 14 to transmit and/or receive the transmission signal along the protection path 18*b* if the working path 18*a* has one or more path failures 26. In one embodiment, the protection path 18*b* is predetermined before the service is activated, as described above, and no license accounting is performed between step 54 and step 58, thereby causing the time between step 54, detecting one or more path failures 26, and step 58, switching to the protection path 18*b*, or failure time, to be minimized. In some embodiments, the time period for recovering from the path failure 26*a* and/or the path failure 26*b* may be less than 50 milliseconds.

In one embodiment, creating a restored path 18' (step 62) is performed by the first node 14*a* and may be performed utilizing GMPLS, that is by using generalized multiprotocol label switching technology. As described above, in order to maintain redundancy, the transmission signal should have a backup path; therefore, a restored path 18' should be created. In one embodiment, the first node 14*a* creates the restored path 18' by analyzing one or more path 18 from the first node 14*a* and the second node 14*b*, where the first node 14*a*, the second node 14*b*, and any node 14 between the first node 14*a* and the second node 14*b* has unlicensed ports that are available to be a part of the restored path 18', and selecting the restored path 18' from the one or more paths 18. In one embodiment, the one or more paths 18 is selected to minimize the number of ports 22*a-n* needed for the restored path 18'. In another embodiment, the one or more paths 18 is selected to minimize the length of the restored path 18'.

In one embodiment, adjusting licenses based on the changes in the path 18 and/or restored path 18' (step 66) is performed by a capacity control engine 112 (shown in FIG. 2, and discussed in more detail below) and includes releasing all licenses required for the path 18 having the path failure 26 and then applying available licenses to the restored path 18' subsequent to the transmission signal being switched to the restored path 18'. Thus, the signals sent to each node 14 to establish the restored path 18' and switch the transmission signal to the restored path 18' are devoid of any licensing instructions.

Figure 2:
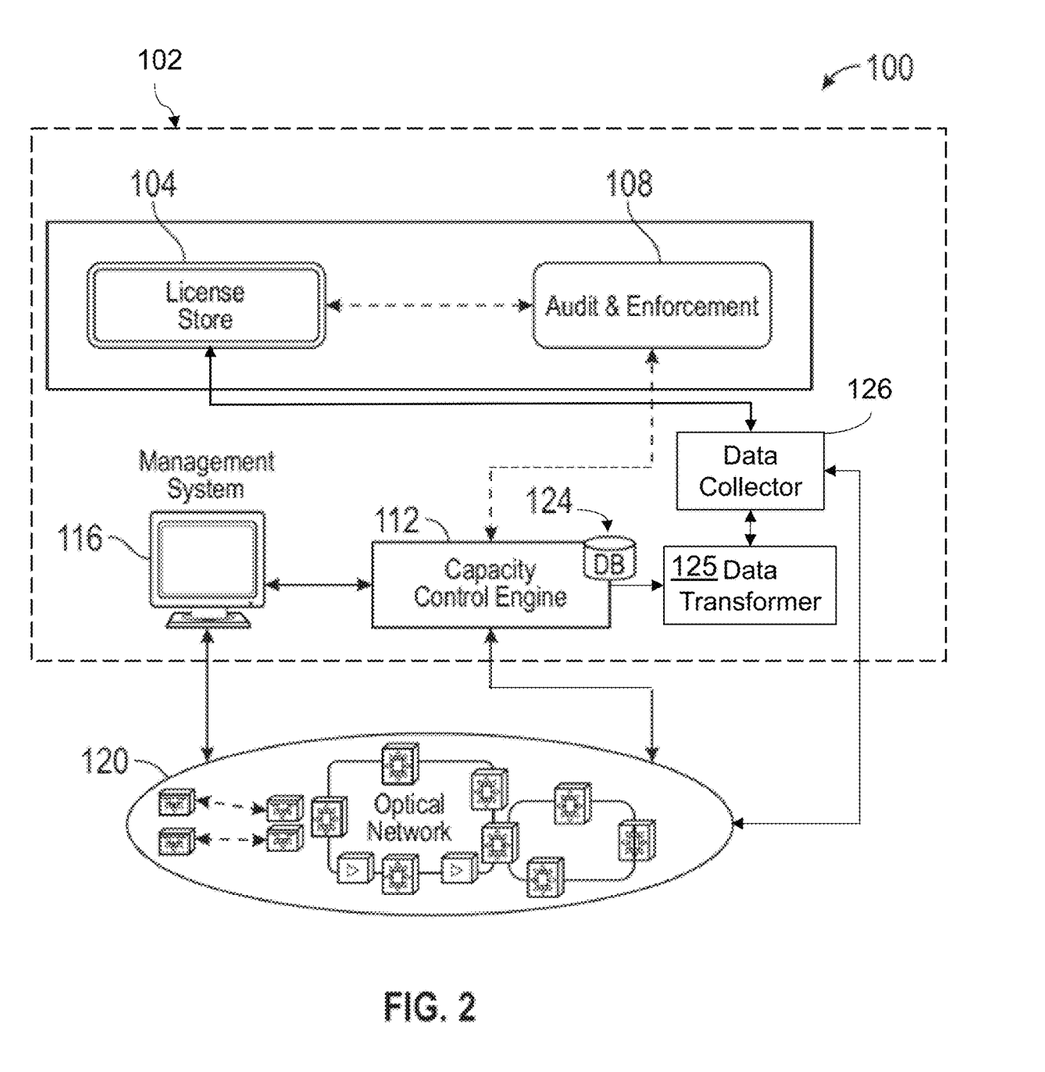
FIG. 2 is a diagram of an exemplary embodiment of an optical network service system diagram.

Referring now to FIG. 2, shown therein is an exemplary embodiment of an optical network service system diagram 100 having a network service system 102 with a license store component 104, an audit and enforcement component 108, the capacity control engine 112, a data transformer 125, a data collector 126, and the management system 116, and an optical network 120. The optical network 120 is comprised of one or more optical network segments 10 (shown in FIG. 1A).

In one embodiment, the license store component 104 is a computer program stored as computer executable instructions on a non-transitory computer-readable medium. The license store component 104 may provide at least one user interface to a user, the user interface providing the user an ability to purchase additional licenses and inform the user of a current state of license usage. The license store component 104 also maintains information about licenses purchased by users and maintains a current state of license usage. Licenses may be activated and/or released based on resource demand of a user of the services requested by the user. For example, additional licenses may be activated to satisfy an increase in the user's resource demand, such as an increase in a number of nodes along the working path 18*a* or the protection path 18*b*, or an increase in the number of services. Additionally, or alternatively, licenses may be released (e.g., when the working path 18*a* or the protection path 18*b* no longer requires the license) to reduce the user's costs associated with having to purchase additional licenses if the licenses were not released due to a path failure. In one embodiment, if the user has purchased licenses that are not needed, e.g. are not required for either the working path 18*a* or the protection path 18*b* for a particular service, the unused licenses may be placed in an unused license pool.

In one embodiment, the audit and enforcement component 108 is a computer program stored as computer executable instructions on a non-transitory computer-readable medium. The audit and enforcement component 108 receives information indicative of the current state of licenses from the license store 104, and tracks license usage within the optical network 120 of each user and tracks license purchases of each user. The audit and enforcement component 108 may enforce license rules unique to each user. By way of example only, a first license rule may prevent provisioning additional services for a particular user if the number of licenses needed to provision a particular service exceeds the number of available licenses for the particular user, whereas, a second license rule may allow provisioning additional services for a particular user if the number of licenses needed to provision a particular service exceeds the number of available licenses for the particular user and the particular user has an agreement that allows for purchasing additional licenses as needed.

In one embodiment, the capacity control engine 112 is a computer program stored as computer executable instructions on a non-transitory computer-readable medium. The capacity control engine 112 tracks license usage for each user and license purchases for each user and stores license usage and license purchase data in a license database 124. The capacity control engine 112 coordinates use of licenses based on network state and automatically transfers licenses once the restored path 18a' is set up and the transmission signal is switched to the protection path 18b. The capacity control engine 112 also provides real-time reconciliation of license entitlement and network usage, in part, by monitoring the optical network 120.

In one embodiment, the capacity control engine 112 is in communication with a data transformer 125. The data transformer converts, or normalizes, platform specific data, such as optical network data, into a platform agnostic capacity utilization record. Thus, the data transformer 125 may store normalized optical network usage data as a platform agnostic capacity utilization record. In one embodiment, the data transformer 125 is in communication with a data collector 126. The data collector 126 collects network data from the optical network 120 and license purchase data from the license store component 104. The data collector 126 then processes and stores the network data for bandwidth utilization and the license purchase data. In one embodiment, the capacity control engine 112 further comprises a license usage engine, which computes license usages and assigns licenses by processing network usage and license purchase data either obtained directly or from the data transformer 125 and stores processed license usage data, and a license report generator, which generates summarized license usage reports. In another embodiment, the license usage engine and the license report generator are components of the audit and enforcement component 108. In yet another embodiment, the data collector 126, data transformer 125, license usage engine, and license report generator operate independently of the capacity control engine 112, the management system 116, the audit and enforcement component 108 and the license store component 104, or operate in conjunction with one or more thereof. In one embodiment, the capacity control engine 112 communicates with the audit and enforcement component 108, thereby providing the capacity control engine 112 with information about newly licenses and enabling the audit and enforcement component 108 to implement any business rules for capacity over consumption.

In one embodiment, the management system 116 is a computer program stored as computer executable instructions on a non-transitory computer-readable medium. In general, the management system 116 monitors the optical network 120. Referring back to FIG. 1A, if the management system 116 detects the first path failure 26a on the working path 18a, the management system 116 release all licenses to the working path 18a. If the management system 116 then detects the second path failure 26b on the protection path 18b, the management system 116 will release all licenses to the protection path 18b. In one embodiment, in the event the first path failure 26a on the working path 18a is corrected and the first path failure 26a is the only failure on either the working path 18a or the protection path 18b, the management system 116 will release licenses to the restored working path 18a' if the restored working path 18a' is not currently being used to transmit the transmission signal. When licenses are released, they may be added to the unused license pool.

In one embodiment, the management system 116 notifies the capacity control engine 112 of adjustments made to the working path 18a and/or the protection path 18b. The capacity control engine 112 may then adjust licenses based on the current paths 18. The capacity control engine 112 may or may not apply license rules to prevent the use of additional licenses.

Figure 3:
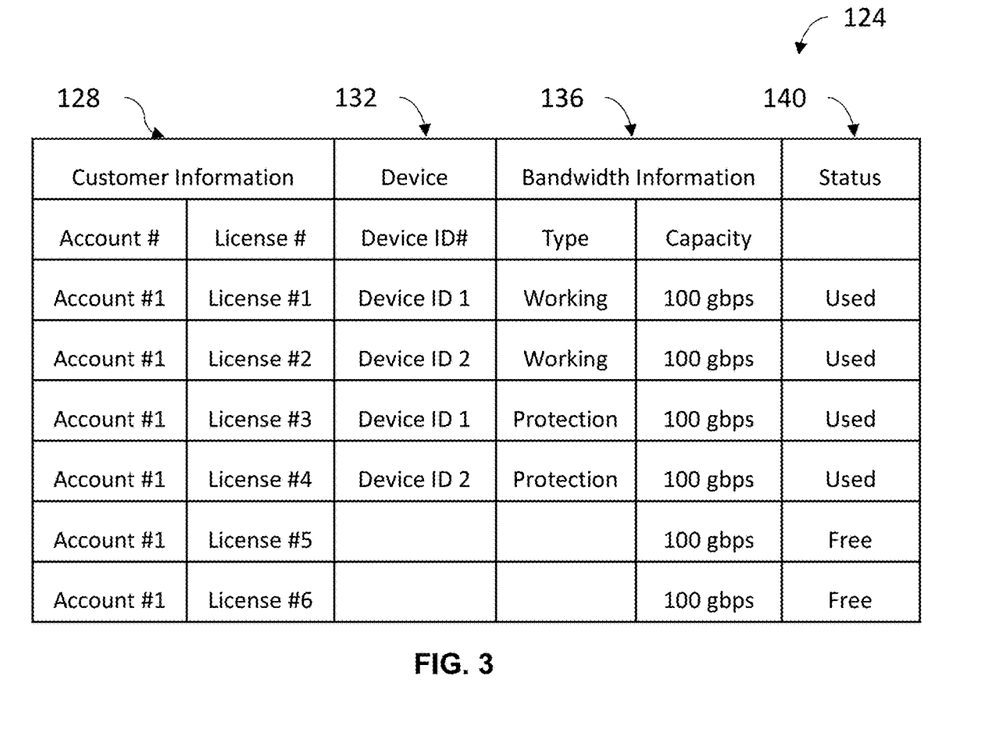
FIG. 3 is an exemplary embodiment of a license database.

Referring now to FIG. 3, shown therein is an exemplary embodiment of the license database 124 having at least a customer information field 128, a device field 132, a bandwidth information field 136, and a license status field 140.

The customer information field 128 may store information identifying a particular license associated with a user. For example, customer information field 128 may store an account number, a license number, and/or some other license related information such as information regarding a user of the license. In one embodiment, the account number may be used to identify billing information such that an account may be charged for provided network services. In another embodiment, the amount charged may be based on the number of licenses issued to the user. The license number identifies the particular license that has been purchased by the user.

In one embodiment, the device field may include a device identifier, such as a serial number and/or a port number, of a network component associated with the license number. The device identifier may correspond to a node and/or a port of the node that has been allocated the license number corresponding to the device identifier as part of the path 18. In one embodiment, the device identifier may identify a particular field replaceable unit (FRU), such as a ROADM, installed in the optical network 120 such as a node 14 or a particular port 22 on a particular node 14.

In one embodiment, the bandwidth information field 136 may store information identifying bandwidth allocated to a particular license such as capacity and bandwidth type, such as whether the particular license is being utilized as part of the working path 18a or as part of the protection path 18b.

In one embodiment, the license status field 140 may store information identifying the status of a particular license, such as whether the particular license is currently being used, that is, whether the particular license if being utilized as part of the working path 18a or the protection path 18b, or whether the particular license is free, that is, the particular license is available to be utilized to create the restored working path 18a' or the restored protection path 18b'. In one embodiment, the license status field 140 may also indicate whether the particular license has been allocated yet, exceeds the number of purchased licenses. A capacity of 100 gbps is shown for illustrative purposes only and is not intended to be limiting. As technology changes, the bandwidth capacity per license may also change to meet future demands.

In one embodiment, the license database 124 may also store information identifying network resources, in addition to or instead of bandwidth allocated to a particular license. For example, bandwidth information field 136 may store information identifying services that a user may wish to receive (e.g., SONET/SDH services, gigabit Ethernet (GbE) services, OTN services, and/or FC services). Additionally, or alternatively, bandwidth information field 136 may store information identifying an amount of resources that the user may wish to receive (e.g., a particular unit of measure of GbE services, a particular unit of measure of SONET/SDH services, etc.) or may store information identifying that the user has purchased the full bandwidth of the device.

In one embodiment, information stored in the license database 124 may be based on a service level agreement (SLA) between a user and the network service provider. For example, the SLA may include information that identifies the bandwidth, services, and/or licenses that the user may use. In some implementations, information stored in the license database 124 may be updated through communication with the audit and enforcement component 108. The audit and enforcement component 108 may communicate license changes with the capacity control engine 112 with the user modifies license requirements, such as by using the license store component 104 to adjust the number of licenses purchased or the direction or destination of a service.

In one embodiment, the capacity control engine 112 may compare licenses used in the optical network 120 with license information stored in the license database 124 to determine available network capacity. Any discrepancies may be referred to the audit and enforcement component 108. In one embodiment, the information stored in the license database 124 may be used to plan network resource allocation allowing an operator to identify network usage trends identified by license information stored in the license database 124.

Figure 4:
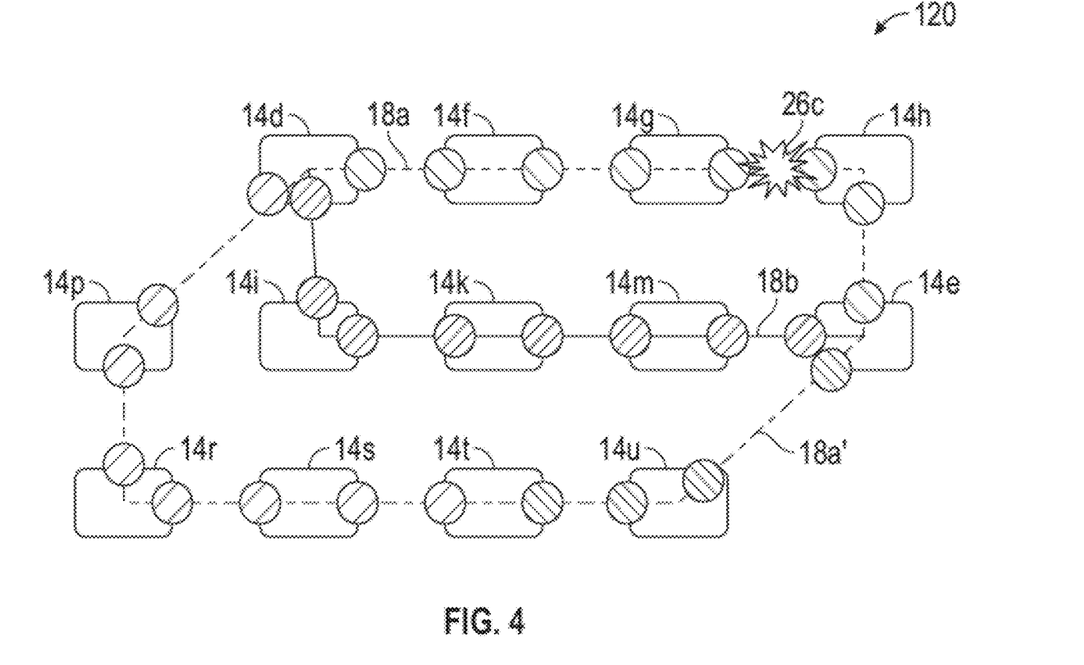
FIG. 4 is an exemplary embodiment of an optical network with a failure in a multi-node path.

While particular fields are shown in a particular format in license database 124, the license database 124 may include additional fields, fewer fields, different fields, or differently arranged fields than are shown in FIG. 4. Additionally, the license database 124 may include more than one database.

Referring now to FIG. 4, shown therein is an exemplary embodiment of the optical network 120 having a plurality of nodes 14, path failure 26c, the working path 18a, the protection path 18b, and the restored working path 18a'. As shown, the working path 18a connects a first terminal node 14d and a second terminal node 14e and traverses node 14f, node 14g, and node 14h. In order to create the working path 18a, the user must have at least eight available licenses. In one embodiment, the licenses are required as follows: one license for the first terminal node 14d, one license for the second terminal node 14e, and two licenses each for node 14f, node 14g, and node 14h. In this example, each port 22 of the nodes 14d, 14e, 14f, 14g and 14h that are allocated to the working path 18a requires a single license.

As shown in FIG. 4, the protection path 18b connects the first terminal node 14d and the second terminal node 14e and traverses node 14i, node 14k, and node 14m. In order to create the protection path 18b, the user must have at least an additional eight available licenses. In one embodiment, the licenses are required as follows: one license for the first terminal node 14d, one license for the second terminal node 14e, and two licenses each for node 14i, node 14k, and node 14m.

As shown in FIG. 4, the path failure 26c has been detected between node 14g and node 14h on the working path 18a. The transmission signal is now switched from the working path 18a to the protection path 18b and the eight licenses used for the working path 18a are released, that is, the eight licenses used for the working path 18a are now free to assign to another path(s). Once the transmission signal is switched to the protection path 18b, the restored working path 18a' is created to connect the first terminal node 14d and the second terminal node 14e by traversing node 14p, node 14r, node 14s, node 14t and node 14u. Once the restored working path 18a' is created, the capacity control engine 112 performs an accounting on the two paths, the protection path 18b and the restored working path 18a'. The restored working path requires twelve (12) licenses as follows: one license for each the first terminal node 14d and the second terminal node 14e and two licenses each for node 14p, node 14r, node 14s, node 14t, and node 14u. The capacity control engine 112 may use the eight licenses released from the working path 18a with the path failure 26c, and apply those licenses to the restored working path 18a'. Once the eight released licenses are applied, the remaining four licenses required for the restored working path 18a' are acquired from the license store 104 on a per-user basis by the audit and enforcement component 108.

Figure 5:
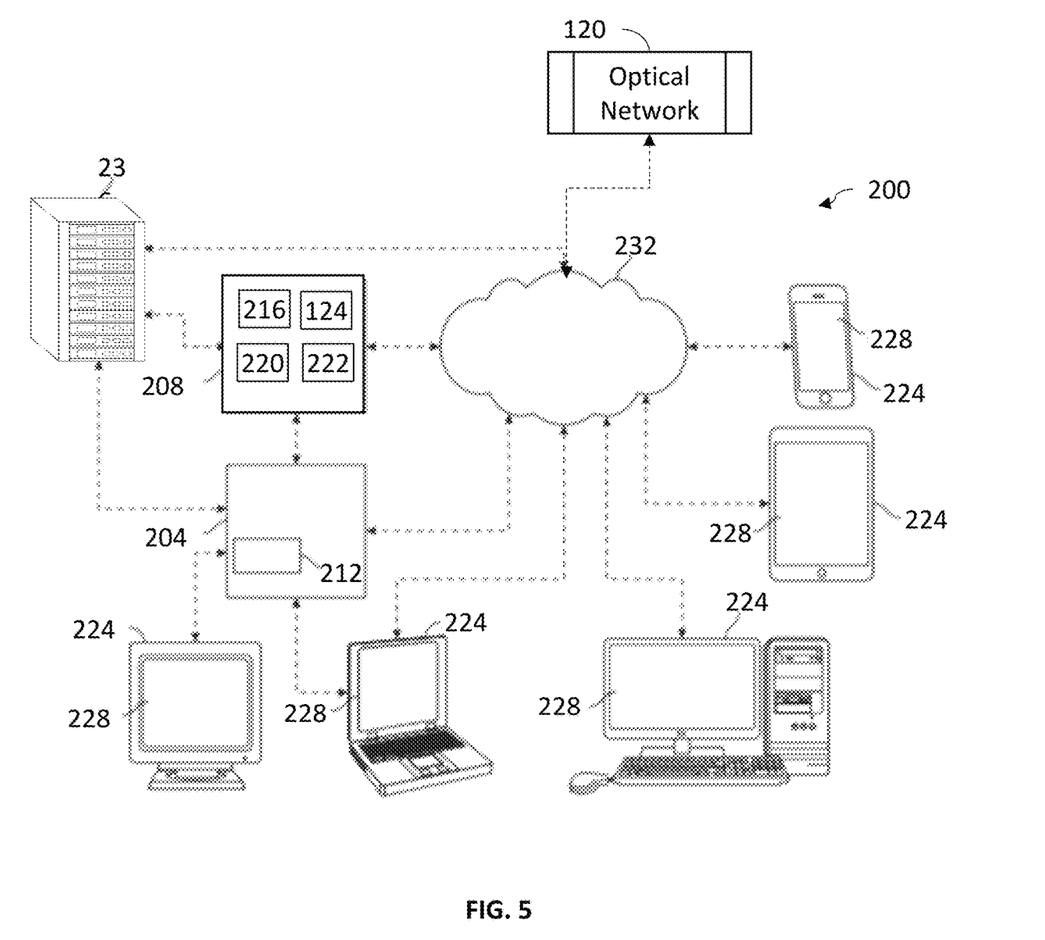
FIG. 5 is a diagram of an exemplary embodiment of a computer system implementing the present disclosure.

Referring now to FIG. 5, shown therein is a computer system 200 in accordance with the present disclosure designed to carry out the optical network restoration process 50. The optical network restoration process 50 may be carried out on one or more computer system 200. The computer system 200 may comprise one or more processor 204, one or more non-transitory computer-readable storage medium 208, and one or more communication component 212. The one or more non-transitory computer-readable storage medium 208 may store one or more database 216, the license database 124, program logic 220, and computer executable instructions 222. The computer system 200 may bi-directionally communicate with a plurality of user devices 224, which may or may not have one or more screens 228, and/or may communicate via a network 232. The processor 204 or multiple processors 204 may or may not necessarily be located in a single physical location.

In one embodiment, the non-transitory computer-readable medium 208 stores program logic, for example, a set of instructions capable of being executed by the one or more processor 204, that when executed by the one or more processor 204 causes the one or more processor 204 to carry out the optical network restoration process 50 or some portion thereof.

In one embodiment, the network 232 is the Internet and the user devices 224 interface with the system via the communication component 212 and a series of web pages. It should be noted, however, that the network 232 may be almost any type of network and may be implemented as the World Wide Web (or Internet), a local area network (LAN), a wide area network (WAN), a metropolitan network, a wireless network, a cellular network, a Global System for Mobile Communications (GSM) network, a code division multiple access (CDMA) network, a 3G network, a 4G network, a 5G network, a satellite network, a radio network, an optical network, a cable network, a public switched telephone network, an Ethernet network, combinations thereof, and/or the like. It is conceivable that in the near future, embodiments of the present disclosure may use more advanced networking topologies.

In one embodiment, the computer system 200 comprises a server system 236 having one or more servers in a configuration suitable to provide a commercial computer-based business system such as a commercial web-site and/or data center. The server system 236 may be connected to the network 232.

The computer system 200 may be in communication with the optical network 120. The computer system 200 may be connected to the optical network 120 through the network 232, however, the network 232 may not be the Internet in all embodiments. In one embodiment, the computer system 200 is an element of a field replaceable unit, or FRU.

Referring now to FIG. 6, shown therein is a block diagram of an exemplary node 14 which may be used to implement the first terminal node 14a, the second terminal node 14b, or the third terminal node 14c. The node 14 has a plurality of C-Band transponders 254, including receivers 254a and transmitters 254b, connected to a C-Band ROADM 258 and a plurality of L-Band transponders 262, including receivers 262a and transmitters 262b, connected to an L-Band ROADM 266, the C-Band ROADM 258 and the L-Band ROADM 266 are coupled together and connected to a hybrid C-Band card 270. The hybrid C-Band card 270 is connected to a first fiber optic line 274 having a first transmission signal traveling in a first direction and connected to a second fiber optic line 278 having a second transmission signal traveling in a second direction different from the first direction. Each of the C-Band transponders 254 and the L-Band transponders 262 is connected to one of the ports 22a-n of the node 14. Only eight ports 22 are depicted in FIG. 6 for simplicity. It is understood that the number of ports 22 in each node 14 may vary depending on hardware used, each installed FRU, capacity requirements, and technology limitations, and therefore the node 14 may also have more than or less than eight ports 22.

The first transmission signal traveling in the first direction enters the hybrid C-Band card 270, is detected by a first photodiode 282 and enters a diverter 286 where a C-Band portion of the first transmission signal is detected by a second photodiode 290, enters the C-Band ROADM 258, is amplified by an amplifier 294, and is then demultiplexed by demultiplexer 298 before traveling to receivers 254a of the C-Band transponders 254, and where an L-Band portion of the first transmission signal enters the L-Band ROADM 266, is detected by a third photodiode 302, is amplified by an amplifier 306, and is then demultiplexed by a demultiplexer 310 before traveling to receivers 262a of the L-Band transponders 262. The C-Band portion of the second transmission signal traveling in the second direction originates at transmitters 254b of the C-Band transponders 254, is multiplexed by a multiplexer 314 before being boosted by an erbium-doped fiber amplifier 318. The L-Band portion of the second transmission signal traveling in the second direction originates at transmitters 262b of the L-Band transponders 262, is multiplexed by a multiplexer 322 before being encoded by the erbium-doped fiber amplifiers 326. The C-Band portion and the L-Band portion are then combined in combiner 328 to form the second transmission signal that is detected by a fourth photodiode 330 and which further passes through the hybrid C-Band card 270 to the second fiber optic line 278. In other embodiments, the node 14 may not include the Hybrid C-Band card 270. Additionally, while receivers 254a and transmitters 254b are shown independently, each transponder 254 is comprised of a transmitter 254b and a receiver 254a. The transponder 254 is diagrammed as two elements, the receiver 254a and the transmitter 254b, for simplicity of the diagram. Similarly, while receivers 262a and transmitters 262b are shown independently, each transponder 262 is comprised of the transmitter 262b and the receiver 262a. The transponder 262 is diagrammed as two elements, the receiver 262a and the transmitter 262b, for simplicity of the diagram. Each of the C-Band ROADM 258, the L-Band ROADM 266, and the hybrid C-Band card 270 may each have an optical supervisory channel 334.

In one embodiment, by monitoring the transmission signal detected by each of the first photodiode 282, the second photodiode 290, the third photodiode 302, and/or the fourth photodiode 330, each node 14 may send a fault event message on the optical supervisory channel 334 to at least one or both of a downstream node, an upstream node, the management system 116, the capacity control engine 112, and/or some combination thereof. Additional photodiodes may be placed such that detection of a failure at a particular element may be determined. In another embodiment, detecting a path failure 26 (Step 54) is performed by receiving the fault event message on the optical supervisory channel. Additionally, it should be noted that even though the node 14 is depicted for a C-Band and an L-Band transmission signal, the bands depicted are not limiting and a similar construction can be used for any band of a transmission signal in a fiber optic network.

From the above description, it is clear that the inventive concepts disclosed and claimed herein are well adapted to carry out the objects and to attain the advantages mentioned herein, as well as those inherent in the invention. While exemplary embodiments of the inventive concepts have been described for purposes of this disclosure, it will be understood that numerous changes may be made which will readily suggest themselves to those skilled in the art and which are accomplished within the spirit of the inventive concepts disclosed and claimed herein.

What is claimed is:

1. A capacity control engine operable for use with an optical network comprising a plurality of users having a processor and a non-transitory computer readable medium storing computer executable code that when executed by the processor causes the processor to:
   track license usage data and license purchase data for each user of the plurality of users;
   store license usage data and license purchase data; and,
   coordinate use of licenses based on a network state such that upon receiving a notification of creation of a restored path due to the network state showing a failed path and a protection path, each license used by the failed path being released to an unused license pool and each license required by the restored path is selected from the unused license pool,
   wherein the computer executable code executed by the processor further causes the processor to:
   provide, to a user of the plurality of users, real-time reconciliation of license entitlement and network usage, the real-time reconciliation of license entitlement being a calculation of a quantity of licenses purchased by the user compared to a quantity of licenses needed for both the protection path and the restored path,
   wherein tracking license usage data and license purchase data for each user of the plurality of users and storing license usage data and license purchase data is performed by a data collector, the data collector having a processor and computer executable non-transitory memory storing computer executable code that when executed by a processor causes the processor to:
   collect the network state for the optical network as bandwidth utilization data, the network state being data representing a working path including identifiers for two or more nodes on the working path and identifiers for one or more fiber line on the working path, the protection path including identifiers for two or more nodes on the protection path and identifiers for one or more fiber line on the protection path, an indicator identifying whether the working path or the protection path is a failed path, and, if the indicator indicates a failed path is present, the restored path including identifiers for two or more nodes on the restored path and identifiers for one or more fiber line on the restored path;
   retrieve license purchase data from a license store component; and,
   store the bandwidth utilization data and license purchase data.

2. The capacity control engine of claim 1, wherein coordinating use of licenses based on a network state includes:
  receiving one or more platform agnostic capacity utilization record, the platform agnostic capacity utilization record being platform specific data normalized by a data transformer.

3. The capacity control engine of claim 1, wherein coordinating use of licenses includes computing license usages based the bandwidth utilization data and assigning licenses by processing bandwidth utilization data and license purchase data.

4. The capacity control engine of claim 3 wherein coordinating use of licenses further includes storing the computed license usages and assigned licenses as processed license usage data.

5. The capacity control engine of claim 1, wherein the computer executable code executed by the processor further causes the processor to:
  communicate license usage data and license purchase data with an audit enforcement engine.

6. The capacity control engine of claim 5, wherein the computer executable code executed by the processor further causes the processor to:
  cause the audit enforcement engine to determine whether the user may utilize a greater number of licenses than the user has purchased.

\* \* \* \* \*